(12) United States Patent
Fujii et al.

(10) Patent No.: US 12,549,837 B2
(45) Date of Patent: Feb. 10, 2026

(54) WEARABLE CAMERA

(71) Applicant: CANON KABUSHIKI KAISHA, Tokyo (JP)

(72) Inventors: Kazuki Fujii, Kanagawa (JP); Kengo Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 18/181,441

(22) Filed: Mar. 9, 2023

(65) Prior Publication Data

US 2023/0319379 A1    Oct. 5, 2023

(30) Foreign Application Priority Data

Mar. 31, 2022  (JP) .................................. 2022-061234
Dec. 21, 2022  (JP) .................................. 2022-204895

(51) Int. Cl.
*H04N 23/50*    (2023.01)
*H04N 23/56*    (2023.01)

(52) U.S. Cl.
CPC ............. *H04N 23/50* (2023.01); *H04N 23/56* (2023.01)

(58) Field of Classification Search
CPC ...... H04N 23/695; H04N 23/50; H04N 23/56; G02B 2027/0138; G06F 1/163
See application file for complete search history.

(56) References Cited

U.S. PATENT DOCUMENTS

| | | | | |
|---|---|---|---|---|
| 11,353,779 B2* | 6/2022 | Iwasaki | .................. | G03B 17/14 |
| 2010/0321556 A1* | 12/2010 | Misawa | .................. | G03B 9/02 |
| | | | | 74/405 |
| 2015/0172538 A1* | 6/2015 | Nordstrom | ........... | H04N 23/661 |
| | | | | 348/207.1 |
| 2016/0210834 A1* | 7/2016 | Dayal | .................... | G01C 21/12 |
| 2019/0219516 A1* | 7/2019 | Kato | .................. | G01N 21/8803 |
| 2019/0354188 A1* | 11/2019 | Ochi | ........................ | G03B 17/02 |
| 2020/0097707 A1* | 3/2020 | Chou | .................. | H04N 23/695 |
| 2020/0337776 A1* | 10/2020 | Saun | ...................... | F16M 13/04 |
| 2020/0351447 A1* | 11/2020 | Marston | .................... | G06T 7/90 |
| 2020/0389577 A1* | 12/2020 | Tanaami | .................. | H04N 7/18 |
| 2021/0120213 A1* | 4/2021 | Beni | .................. | G02B 27/0101 |
| 2021/0152780 A1* | 5/2021 | Hanayama | ........... | H04N 23/683 |
| 2021/0208675 A1* | 7/2021 | Qin | ........................ | H04N 23/57 |
| 2023/0072561 A1* | 3/2023 | Yoon | .................. | A63B 69/3608 |
| 2023/0100382 A1* | 3/2023 | Sharma | .................. | G03B 17/17 |
| | | | | 348/373 |
| 2023/0232105 A1* | 7/2023 | Hausen | ................ | G03B 17/561 |
| | | | | 348/207.99 |
| 2023/0291873 A1* | 9/2023 | Cutri | ...................... | H04N 23/65 |
| 2023/0335253 A1* | 10/2023 | Connor | .................... | G06F 3/013 |

FOREIGN PATENT DOCUMENTS

JP         6740641 B2      8/2020

* cited by examiner

*Primary Examiner* — Chiawei Chen
(74) *Attorney, Agent, or Firm* — Canon U.S.A., Inc. IP Division

(57) ABSTRACT

A wearable camera worn and used by a user includes an imaging unit configured to capture an image of a subject, an irradiation unit configured to emit light in substantially parallel to an optical axis of the imaging unit, an attachment unit for attaching the wearable camera to the user, and a movable unit that is provided at a part of the attachment unit, wherein the imaging unit and the irradiation unit are arranged at the movable unit.

14 Claims, 22 Drawing Sheets

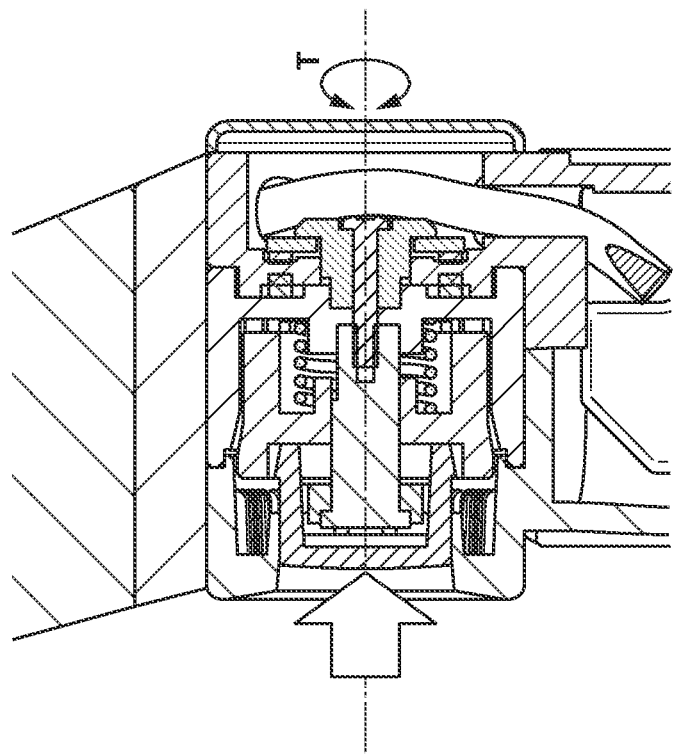
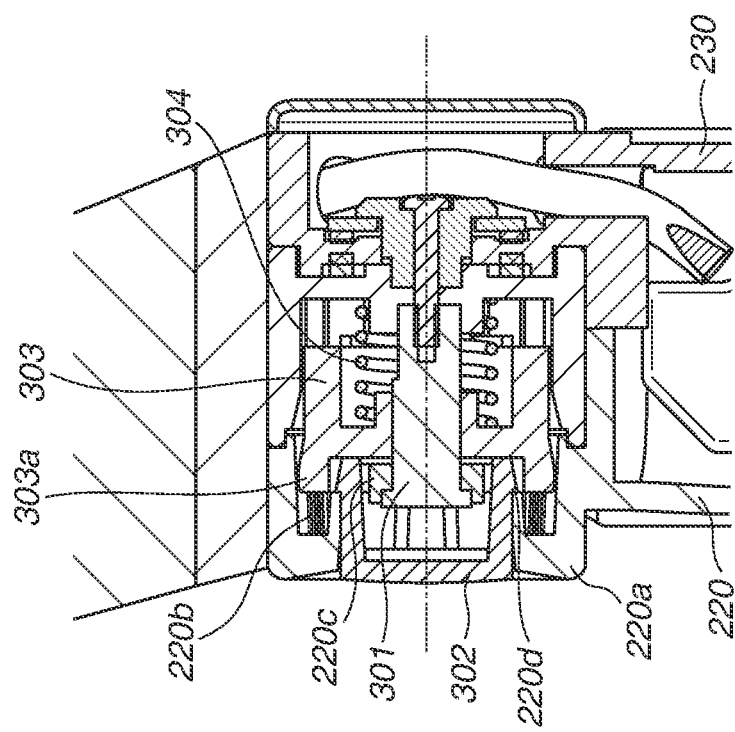

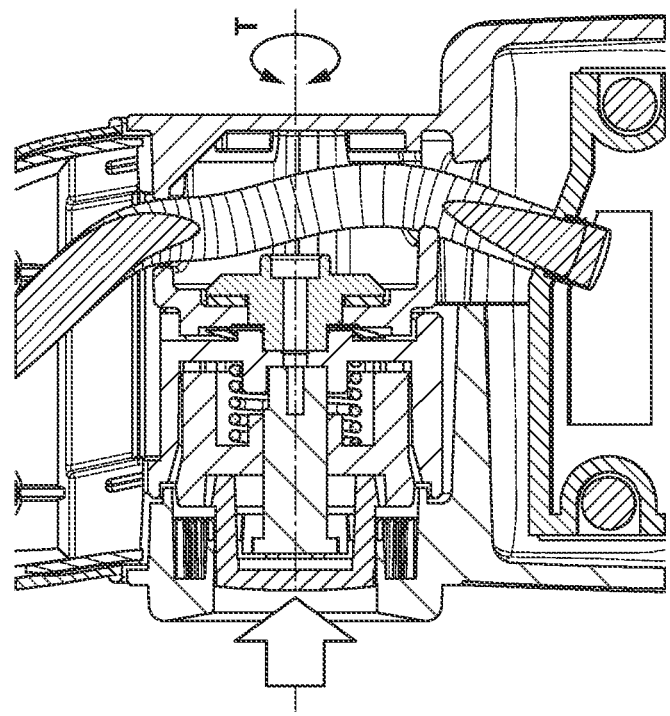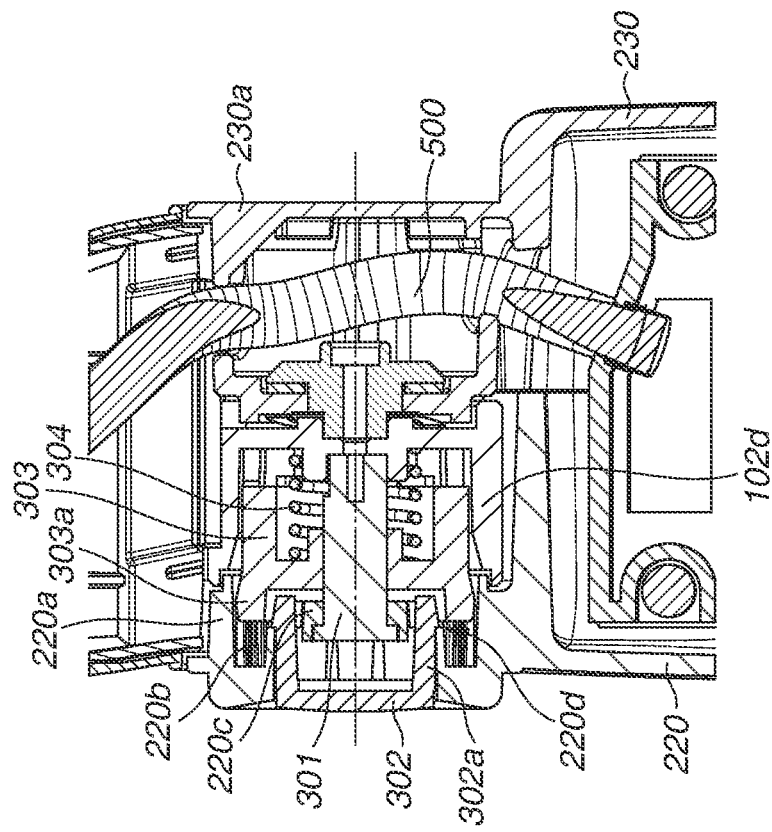

FIG.17A
FIG.17B
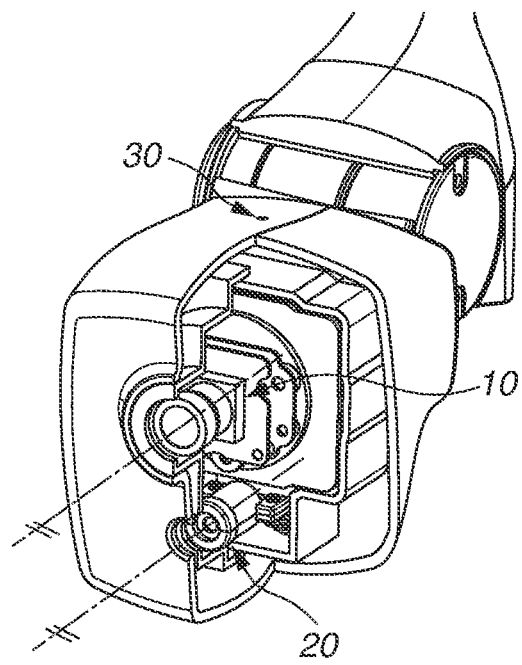
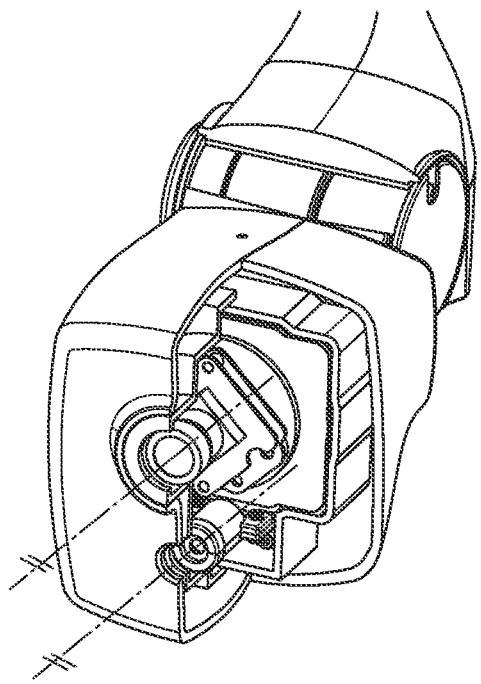

WEARABLE CAMERA

BACKGROUND

Field

The present disclosure relates to a wearable camera.

Description of the Related Art

In recent years, wearable cameras have attracted attention. Various types of wearable cameras, such as eyeglass type, necklace type, watch type, and ring type, are known.

A use application of wearable cameras is remote work assistance at facility maintenance or manufacturing sites, for example. A site worker wearing a wearable camera transmits real-time video images and sounds to an assistant at a remote location, and the assistant can provide instructions and information to the worker based on the video images and sounds.

The wearable camera discussed in Japanese Patent No. 6740641 is a necklace-type device that includes an imaging unit with a lens adjustable in angle.

SUMMARY

According to an aspect of the present disclosure, a wearable camera worn and used by a user includes an imaging unit configured to capture an image of a subject, an irradiation unit configured to emit light in substantially parallel to an optical axis of the imaging unit, an attachment unit for attaching the wearable camera to the user, and a movable unit that is provided at a part of the attachment unit, wherein the imaging unit and the irradiation unit are arranged at the movable unit.

Further features of the present disclosure will become apparent from the following description of exemplary embodiments with reference to the attached drawings.

BRIEF DESCRIPTION OF THE DRAWINGS

FIGS. 5A and 5B are cross-sectional views of the lock mechanism of the movable unit according to the first exemplary embodiment.

FIGS. 13A and 13B are cross-sectional views of the movable unit according to the second exemplary embodiment.

FIGS. 17A and 17B are partial cross-sectional views of a turning unit according to the second exemplary embodiment, which illustrates the turning state of the turning unit.

DESCRIPTION OF THE EMBODIMENTS

Figure 1:
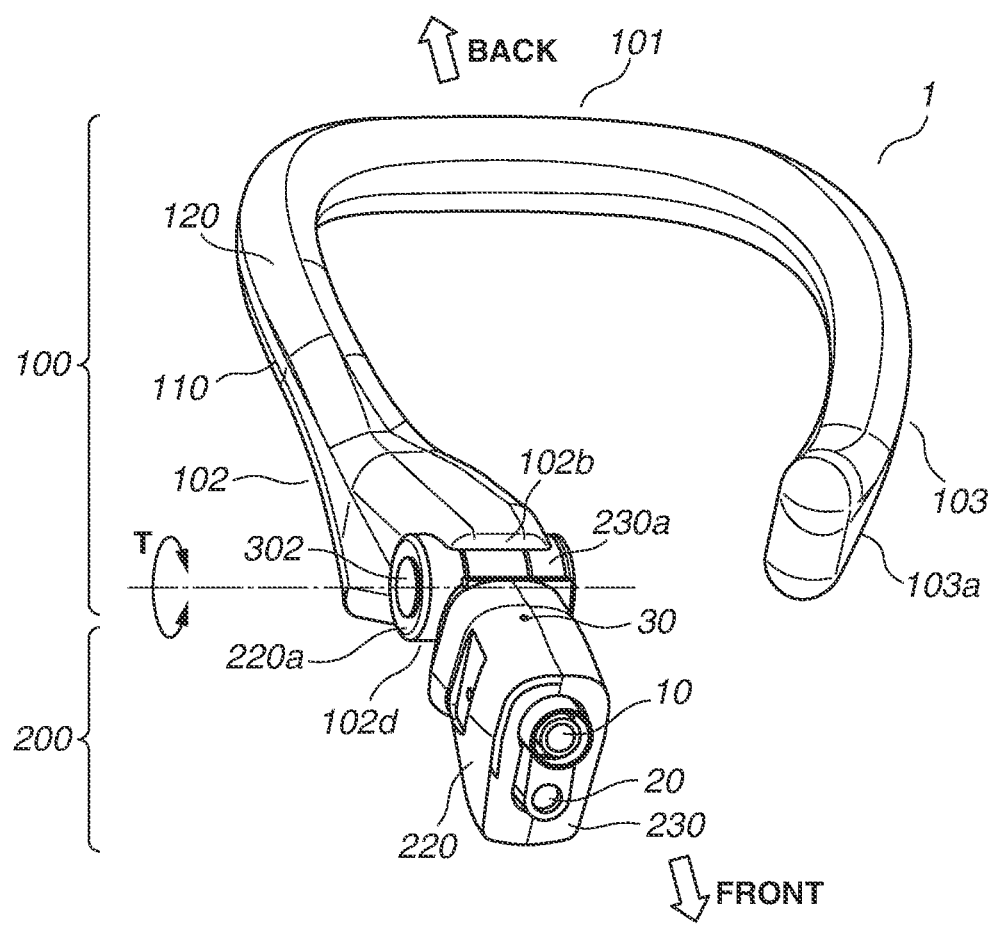
FIG. 1 is a perspective view of a wearable camera according to a first exemplary embodiment.

Hereinafter, preferred exemplary embodiments of the present disclosure will be described in detail with reference to the accompanying drawings. Components not directly relating to the present disclosure will not be described herein or illustrated in the drawings. Configurations described in relation to the following exemplary embodiments are merely examples, and the present disclosure is not limited to the configurations illustrated in the drawings.

First, a configuration of a wearable camera 1 according to a first exemplary embodiment will be described with reference to FIGS. 1 to 5. The wearable camera 1 includes a fixed unit (wearing part) 100 and a movable unit 200 in which an imaging unit 10 and a pointer unit 20 are arranged.

The fixed unit 100 is formed by assembling a lower case 110 and an upper case 120. The fixed unit 100 has a right arm unit 102 extending forward from a base unit 101 and a left arm unit 103 extending forward from the base unit 101 so as to form a substantially U shape. Front ends of the right arm unit 102 and left arm unit 103 have a shape curved toward the lower side of the wearable camera 1. In the present exemplary embodiment, the base unit 101, the right arm unit 102, and the left arm unit 103 are integrated. Alternatively, these parts may be separately provided and assembled together.

The front end of the right arm unit 102 has a contact surface 102a whose normal line extends toward the back of the wearable camera 1, end surfaces 102b and 102c, and a cylindrical portion 102d that is rotatable around an axis approximately orthogonal to the front-back direction of the wearable camera 1. The front end of the left arm unit 103 has a contact surface 103a.

The movable unit 200 is movable with respect to the fixed unit 100. In the movable unit 200, a camera unit 210 is covered with a right case 220 and a left case 230. The camera unit 210 has a casing 40 molded of a resin or the like. The imaging unit 10, the pointer unit 20 as an irradiation unit, and a sound collection unit 30 are arranged in the casing 40. The imaging unit 10 and the pointer unit 20 are arranged such that their respective optical axes are approximately parallel to each other. In a side view of the wearable camera 1, with the optical axis of the imaging unit 10 as a base axis, the sound collection unit 30 is arranged on the upper side of the wearable camera 1 with respect to the base axis, and the pointer unit 20 is arranged on the lower side of the wearable camera 1 with respect to the base axis.

The camera unit 210 may be equipped with an electrical substrate on which electrical elements such as a connector for sound signal transmission (not illustrated) are mounted. In this case, the electrical substrate is arranged such that a plug (male side) for sound signal transmission does not interfere with other components of the wearable camera 1.

The imaging unit 10 includes an imaging element substrate on which a lens unit and an imaging element not illustrated are mounted. A video signal acquired by the imaging unit 10 is transmitted to a battery unit not illustrated through an electrical connection unit such as a cable not illustrated. The imaging unit 10 is powered through the electrical connection unit.

The pointer unit 20 includes a light source not illustrated. The light source may be a highly directive laser pointer or a light-emitting diode, for example. In a case where a light source such as a light-emitting diode is used, the pointer unit 20 further includes at least one lens that collects emitted light with enhanced directivity. The pointer unit 20 is powered by the battery unit through an electrical connection unit such as a cable not illustrated.

The pointer unit 20 further includes a switch 21 for controlling light emission of the light source. The switch 21 is a push-type switch that is conductive only when the switch 21 is pressed, for example, and is arranged such that the optical axis direction of the light source and the pressing direction are substantially parallel to each other.

The sound collection unit 30 is an electrical element such as a microphone not illustrated for acquiring the voice of the user of the wearable camera 1, for example, and is configured to transmit a sound signal to the battery unit by an electrical connection unit such as a cable not illustrated. The sound collection unit 30 is powered by the battery unit through the electrical connection unit.

The right case 220 and the left case 230 are substantially rectangular members molded of a resin or the like, and have cylindrical parts 220a and 230a near their respective corners around an axis substantially orthogonal to the front-back direction of the wearable camera 1. The right case 220 has an internal lock gear 220b on the inner wall of the cylindrical portion 220a and a cylindrical step portion 220c substantially coaxial to the cylindrical portion 220a. The cylindrical step portion 220c has an engagement portion 220d. The internal lock gear 220b has a rib shape with comb teeth equally spaced on the circumference of a circle.

The movable unit 200 is assembled to the fixed unit 100 with a shaft 301 such that the cylindrical portion 102d of the fixed unit 100, the cylindrical portion 220a of the right case 220, and the cylindrical portion 230a of the left case 230 have substantially the same axis (hereinafter, referred to as T axis), and is rotatable around the T axis. The movable unit 200 includes the right case 220 and the left case 230 with an upper end surface 200a and a lower end surface 200b. A lock mechanism 300 is formed at the assembled section of the fixed unit 100 and the movable unit 200.

The lock mechanism 300 of the movable unit 200 will be described in detail. The lock mechanism 300 is a mechanism for regulating the mobility of the movable unit 200. The lock mechanism 300 has a turning unlock button 302, a turning lock gear 303, and an elastic member 304. The lock mechanism 300 is arranged at the assembled section of the fixed unit 100 and the movable unit 200, that is, at the boundary section between the fixed unit 100 and the movable unit 200.

The turning unlock button 302 is a cylindrical molded member made of a resin or the like, and has a snap-fit portion 302a on a side surface. The turning lock gear 303 is a cylindrical molded member made of a resin or the like, and has an external lock gear 303a on the outer periphery of the cylindrical unit. The external lock gear 303a has a rib shape with comb teeth equally spaced on the circumference of a circle.

The elastic member 304 is a compression coil spring made of a metal such as stainless used steel (SUS), for example.

Figure 2:
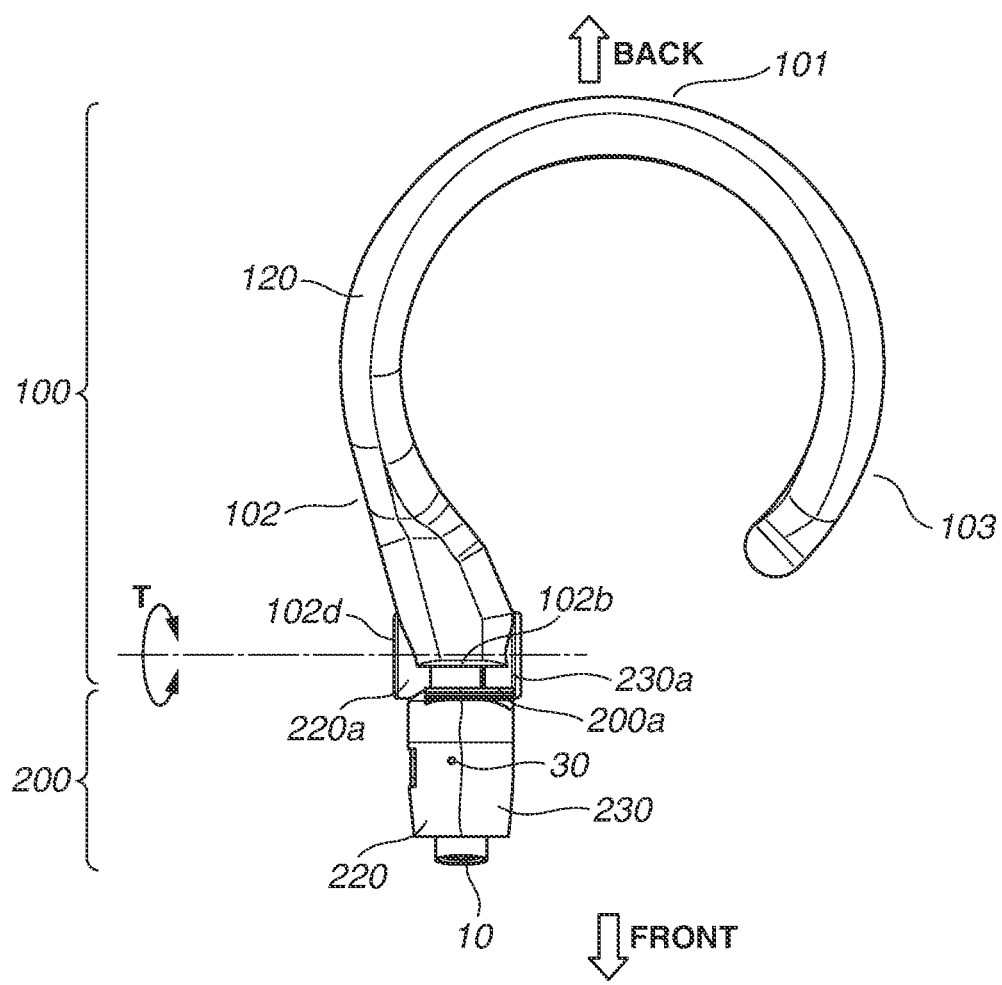
FIG. 2 is a plan view of the wearable camera according to the first exemplary embodiment.
Figure 3:
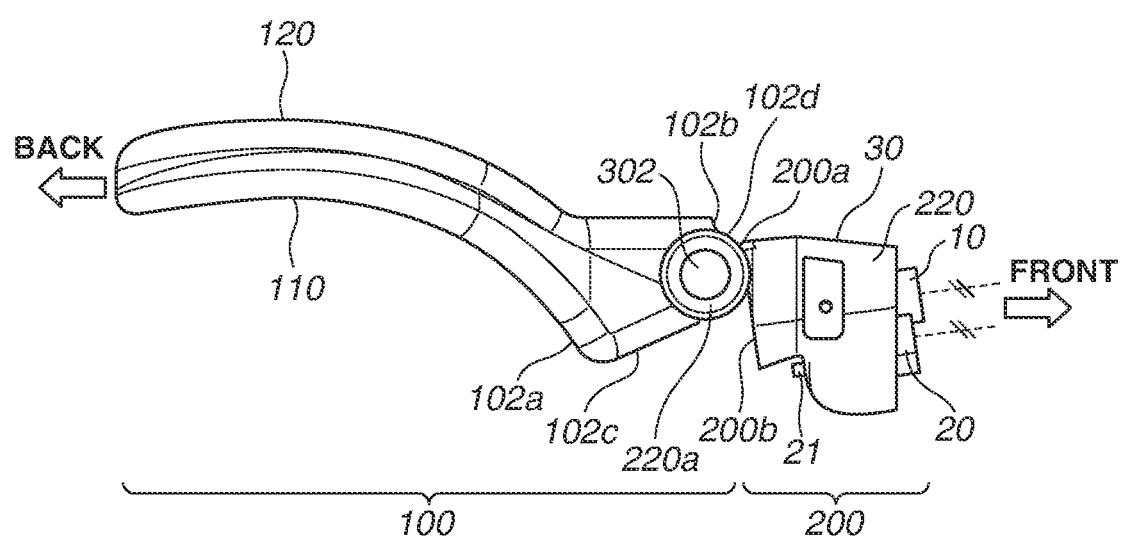
FIG. 3 is a side view of the wearable camera according to the first exemplary embodiment.
Figure 4:
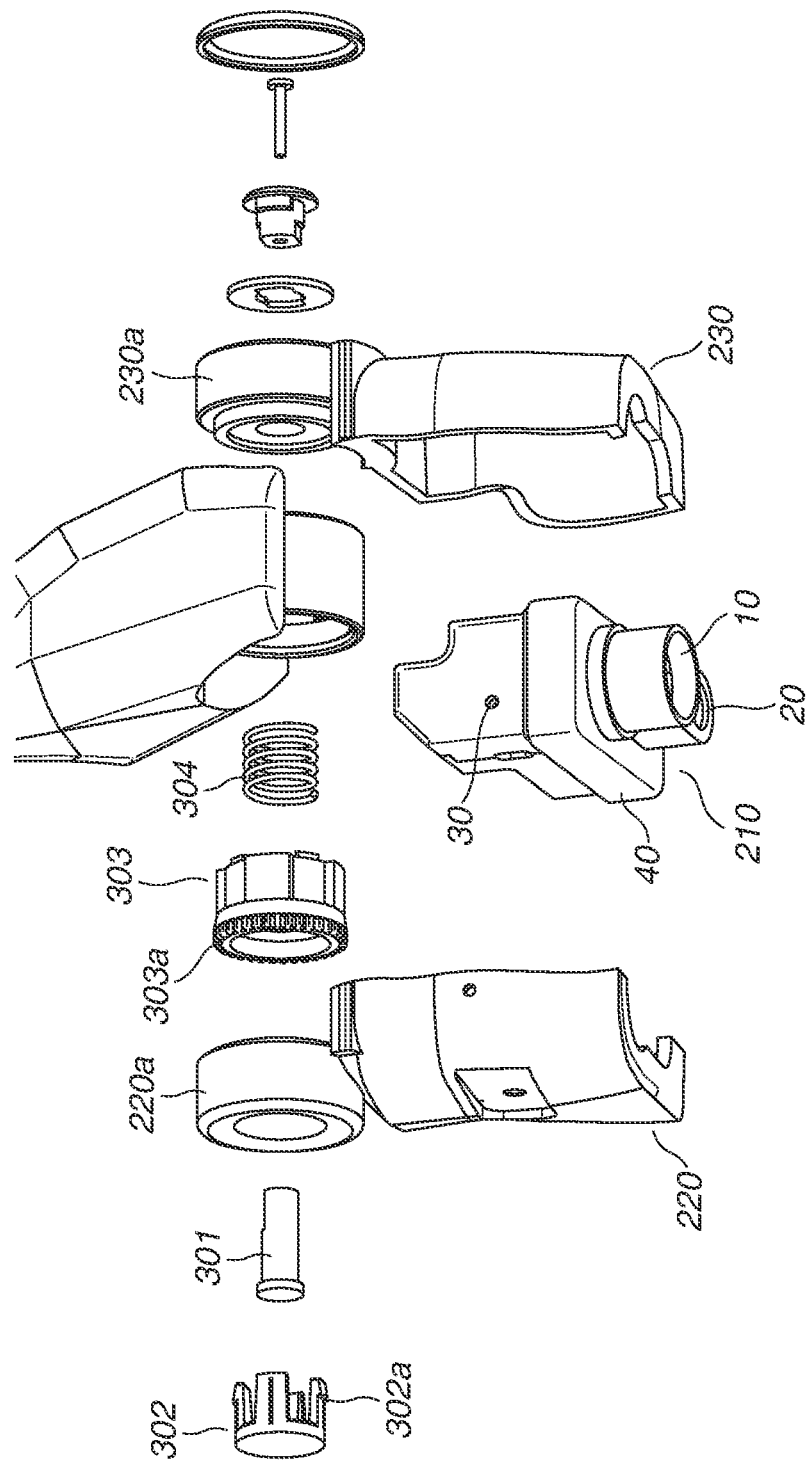
FIG. 4 is a unit diagram describing a lock mechanism of a movable unit according to the first exemplary embodiment.

The turning lock gear 303 and the elastic member 304 are assembled so as to be sandwiched between the cylindrical portion 102d of the fixed unit 100 and the cylindrical portion 220a of the right case 220 so as to be concentric to the T axis illustrated in FIG. 2. As the turning lock gear 303 and the elastic member 304 are assembled in this manner, the turning lock gear 303 is biased to the cylindrical portion 220a of the right case 220. The turning unlock button 302 is fitted into the cylindrical step portion 220c of the right case 220, and is engaged with the snap-fit portion 302a of the turning unlock button 302 and the engagement portion 220d formed at the cylindrical step portion 220c of the right case 220, whereby the turning unlock button 302 is assembled to the right case 220.

With this configuration, as illustrated in FIG. 5A, the external lock gear 303a of the biased turning lock gear 303 and the internal lock gear 220b of the right case 220 mesh with each other, so that the movable unit 200 with respect to the fixed unit 100 is locked so as not to turn.

In a case where the movable unit 200 is turned, as illustrated in FIG. 5B, the turning unlock button 302 is pressed in the direction of the T axis to slide the turning lock gear 303 on the end surface of the turning unlock button 302. Operating in this manner disengages the external lock gear 303a of the turning lock gear 303 and the internal lock gear 220b of the right case 220 and causes the movable unit 200 to turn with respect to the fixed unit 100.

In a case where the wearable camera 1 configured as described above is to be attached, for example, the user brings the base unit 101 of the fixed unit 100 into contact with the back of the neck. Then, the user hangs the entire device on the neck such that the contact surface 102a of the right arm unit 102 and the contact surface 103a of the left arm unit 103 come into contact with the vicinity of the breast. In this manner, the wearable camera 1 according to the present exemplary embodiment is worn on the user's neck such that the right arm unit 102 and left arm unit 103 of the fixed unit 100 sandwich the user's neck.

Figure 6C:
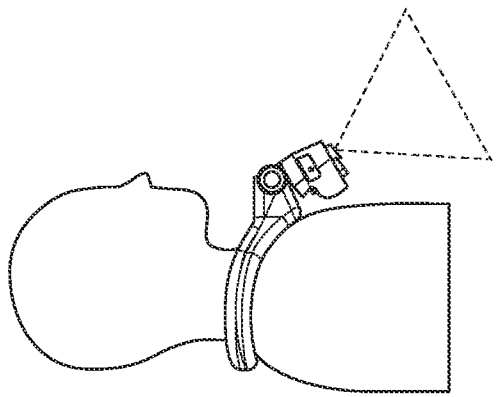
FIGS. 6A to 6C are side views of the wearable camera according to the first exemplary embodiment, which illustrate movable ranges of the wearable camera in turning directions.
Figure 6B:
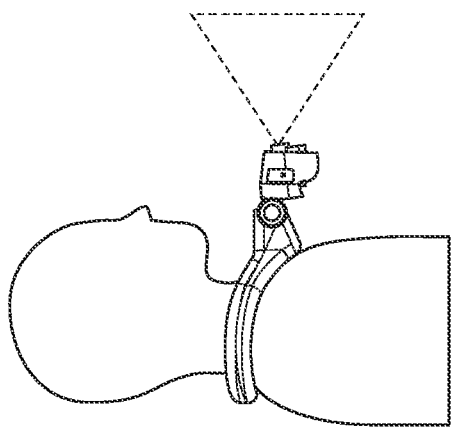
Figure 6A:
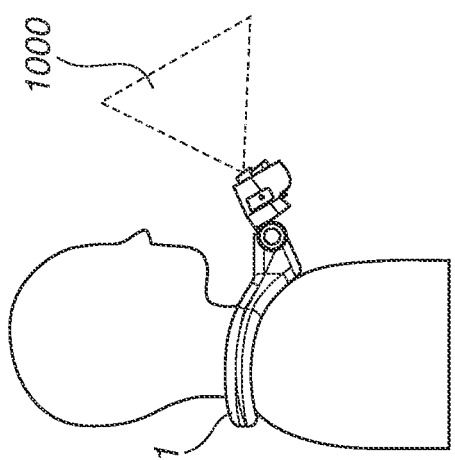

The movable ranges of the wearable camera 1 configured as described above will be described with reference to FIG. 6A that is a side view of the wearable camera 1 turned upward, FIG. 6B that is a side view of the wearable camera 1 in a non-turned state, and FIG. 6C that is a side view of the wearable camera 1 turned downward.

The user wearing the wearable camera 1 can manually operate the movable unit 200 to turn around the T axis. In a case where the user operates the movable unit 200 to turn upward, the movable unit 200 can be turned up to the angle at which the end surface 102b of the fixed unit 100 and the upper end surface 200a of the movable unit 200 are in contact with each other. In a case where the user operates the movable unit 200 to turn downward, the movable unit 200 can be turned up to the angle at which the end surface 102c of the fixed unit 100 and the lower end surface 200b of the movable unit 200 are in contact with each other. Each of the movable angles is preferably set such that the movable unit 200 does not contact the user when the movable unit 200 is moved at that angle. In this manner, the movable unit 200 can be moved to adjust the orientation of the imaging unit 10 (imaging direction) and the orientation of the pointer unit 20 (irradiation direction) at the same time.

When the user wears the wearable camera 1 configured as described above, the sound collection unit 30, the imaging unit 10, and the pointer unit 20 are arranged in this manner from the user's point of view, and the voice uttered by the user can be favorably acquired by the sound collection unit 30.

Figure 7:
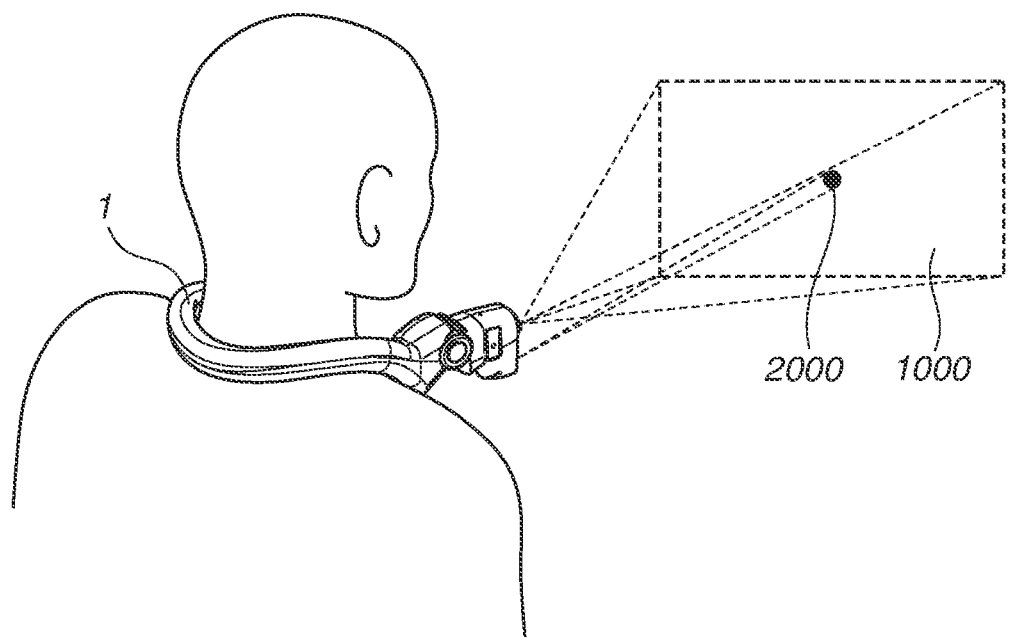
FIG. 7 is a schematic diagram illustrating a state in which a user wears the wearable camera according to the first exemplary embodiment.

FIG. 7 is a schematic diagram illustrating the field of view of a user who wears the wearable camera 1 according to the first exemplary embodiment. According to the wearable camera 1 configured as described above, the respective optical axes of the imaging unit 10 and pointer unit 20 are arranged substantially parallel to each other, so that spot light 2000 from the pointer unit 20 can be displayed in substantially the center of an imaging range 1000 of the imaging unit 10.

A turning operation of the movable unit 200 and an operation of the pointer unit 20 in the wearable camera 1 according to the present exemplary embodiment will be described in detail with reference to FIG. 8.

In the wearable camera 1 according to the present exemplary embodiment, the switch 21 of the pointer unit 20 is arranged under the turning unlock button 302 in side view. Accordingly, the direction of pressing the switch 21 and the direction of turning the movable unit 200 substantially coincide with each other, so that the user can perform light emission control with the switch 21 and adjust the imaging direction through turning of the movable unit 200 by one hand at the same time. Specifically, the user can perform all these operations by one hand, by adjusting the movable angle of the movable unit 200 while pressing the turning unlock button 302 with the right hand's index finger and pressing the switch 21 by the right hand's thumb.

As described above, in the wearable camera 1 according to the present exemplary embodiment, the imaging position can be easily specified. With the wearable camera 1, the user can adjust the imaging direction of the imaging unit 10 to the desired working position so that the subject to be imaged can fall within the angle of field. Further, as the movable unit 200 is provided with the pointer unit 20, the user can easily specify the imaging position even with an adjustment made to the imaging direction.

A wearable camera according to a second exemplary embodiment will be described with reference to FIGS. 9 to 20. In FIGS. 9 to 20, components identical to those of the wearable camera according to the first exemplary embodiment are given identical reference signs, and description of these components will be omitted unless they have new configuration.

Figure 9:
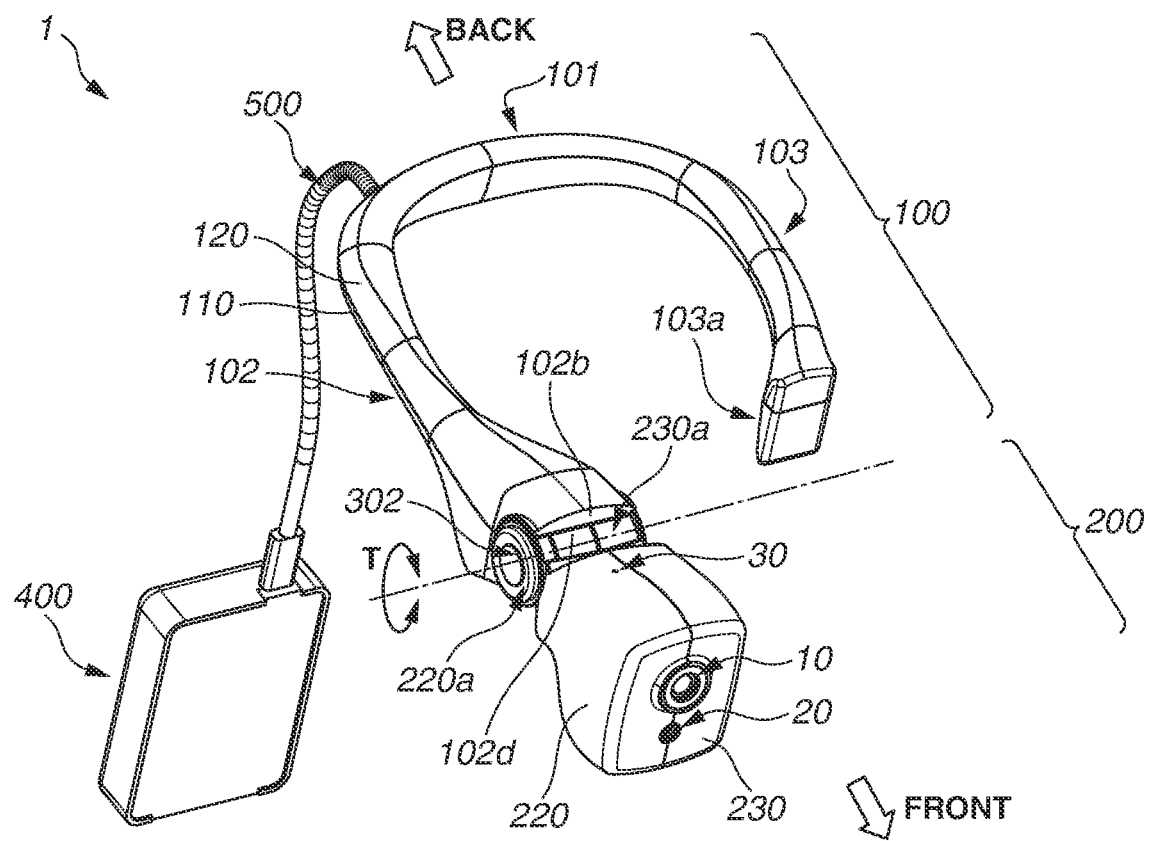
FIG. 9 is a perspective view of a wearable camera according to a second exemplary embodiment.

FIG. 9 is a perspective view of a wearable camera according to the present exemplary embodiment. A wearable camera 1 newly has a control unit 400 and a main cable, as compared with the first exemplary embodiment.

Accordingly, the wearable camera 1 includes a fixed unit 100, a movable unit 200, the control unit 400, and a main cable 500. The operations of the control unit 400 will be described below.

Figure 10:
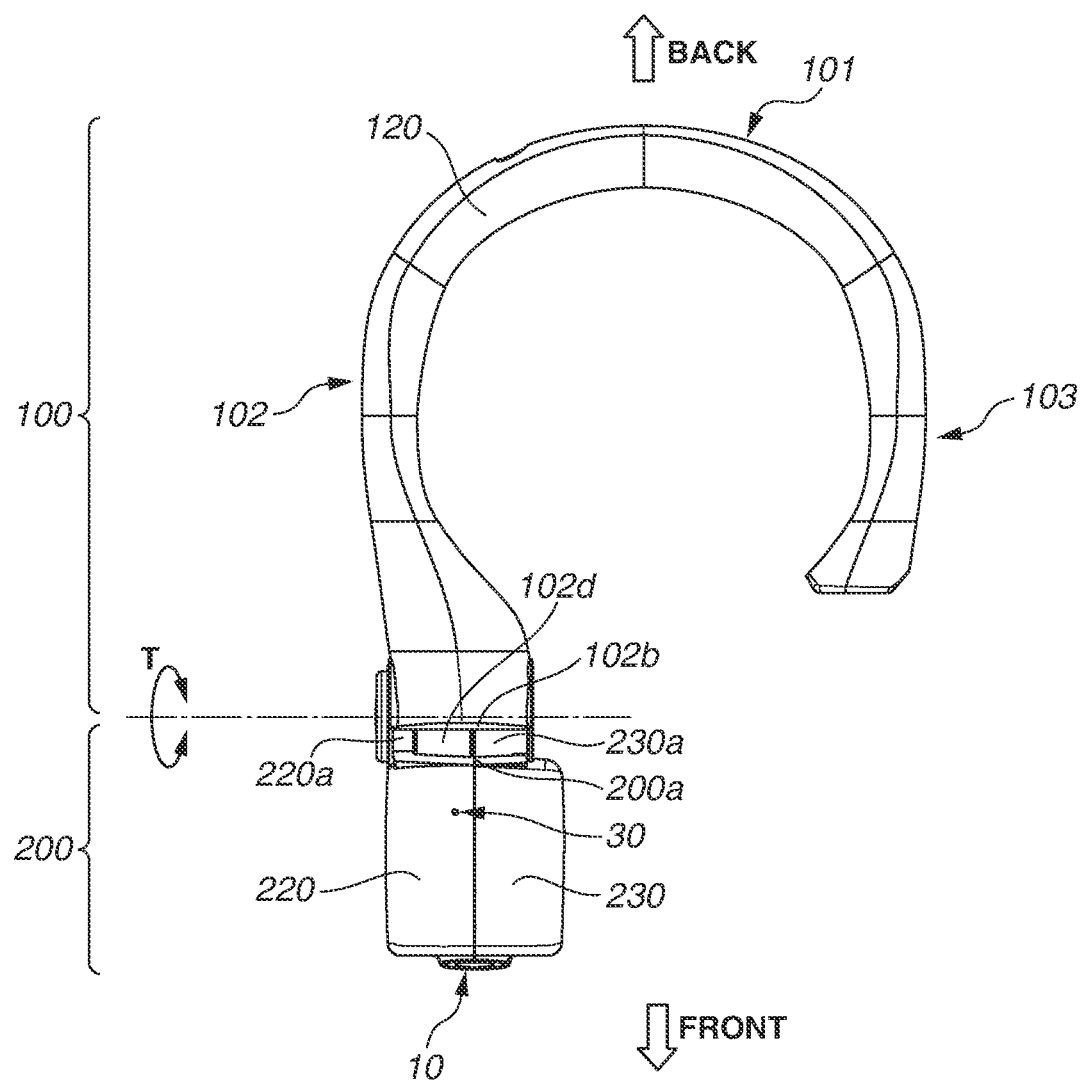
FIG. 10 is a plan view of the wearable camera according to the second exemplary embodiment.
Figure 11:
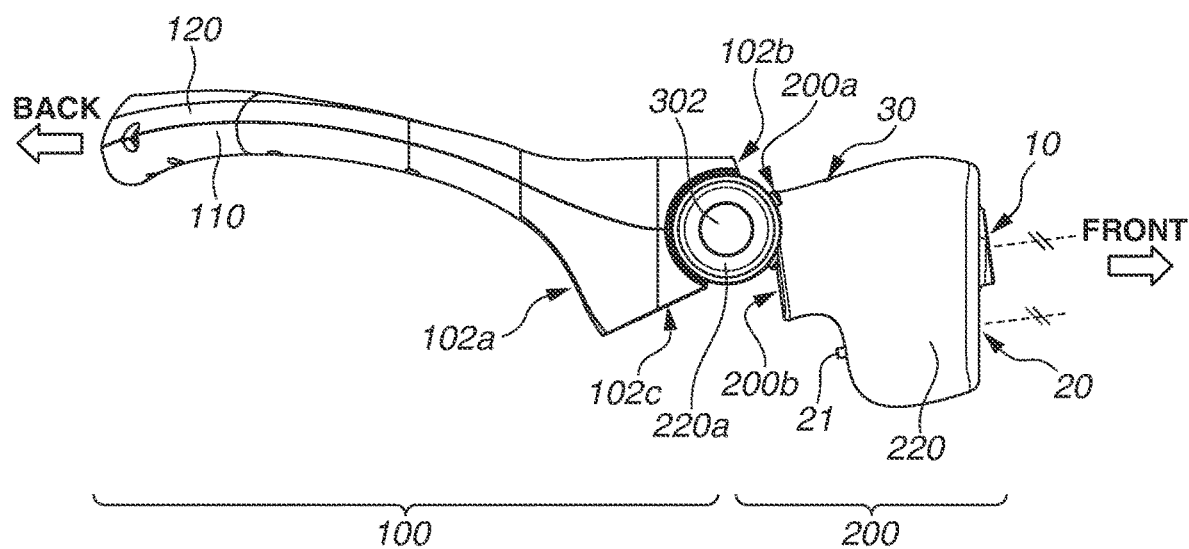
FIG. 11 is a side view of the wearable camera according to the second exemplary embodiment.
Figure 12:
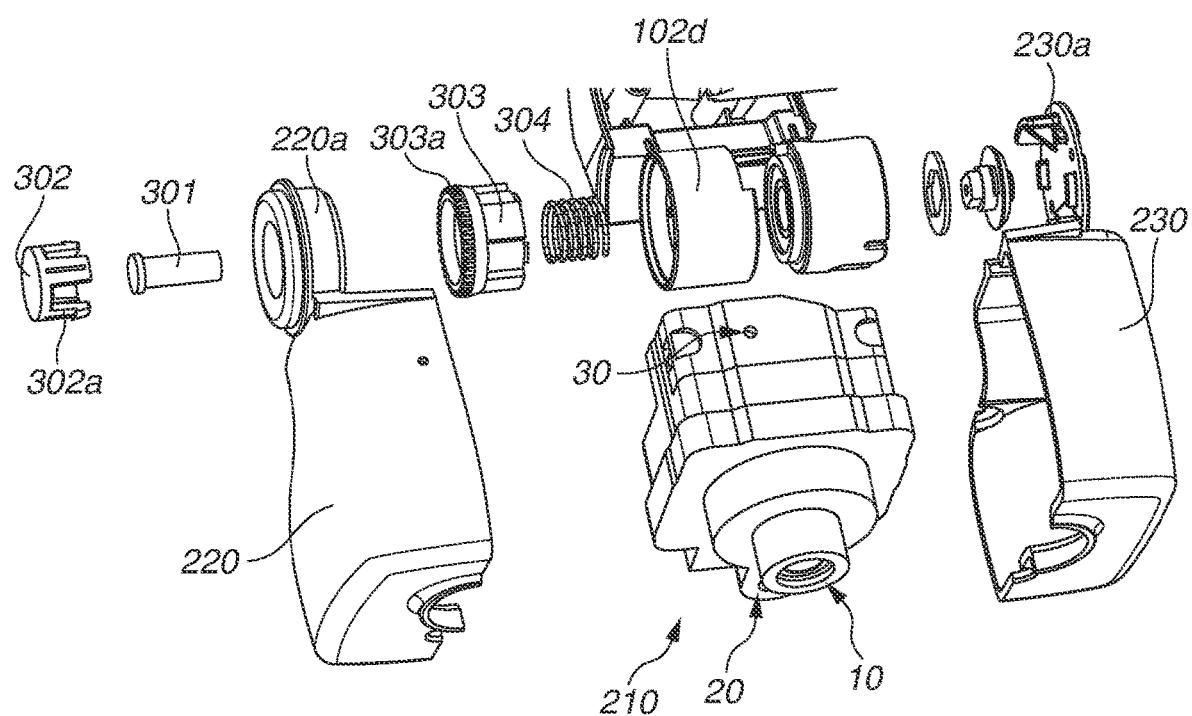
FIG. 12 is an exploded perspective view of a movable unit according to the second exemplary embodiment.

FIGS. 10 and 11 are a plan view and a side view of the wearable camera 1 according to the present exemplary embodiment, respectively. The second exemplary embodiment has a configuration identical to that of the first exemplary embodiment except for the shape of the wearable camera 1, and has functions identical to those of the first exemplary embodiment, and thus description of the wearable camera 1 with reference to FIGS. 10 and 11 will be omitted. The same applies to the description with reference to FIG. 12.

FIG. 13 is a cross-sectional view of the movable unit 200 according to the present exemplary embodiment. The main cable 500 extends up to the movable unit 200 through the fixed unit 100, and is wired to a camera unit 210 through the movable unit 200 as illustrated in FIG. 13.

Figure 14:
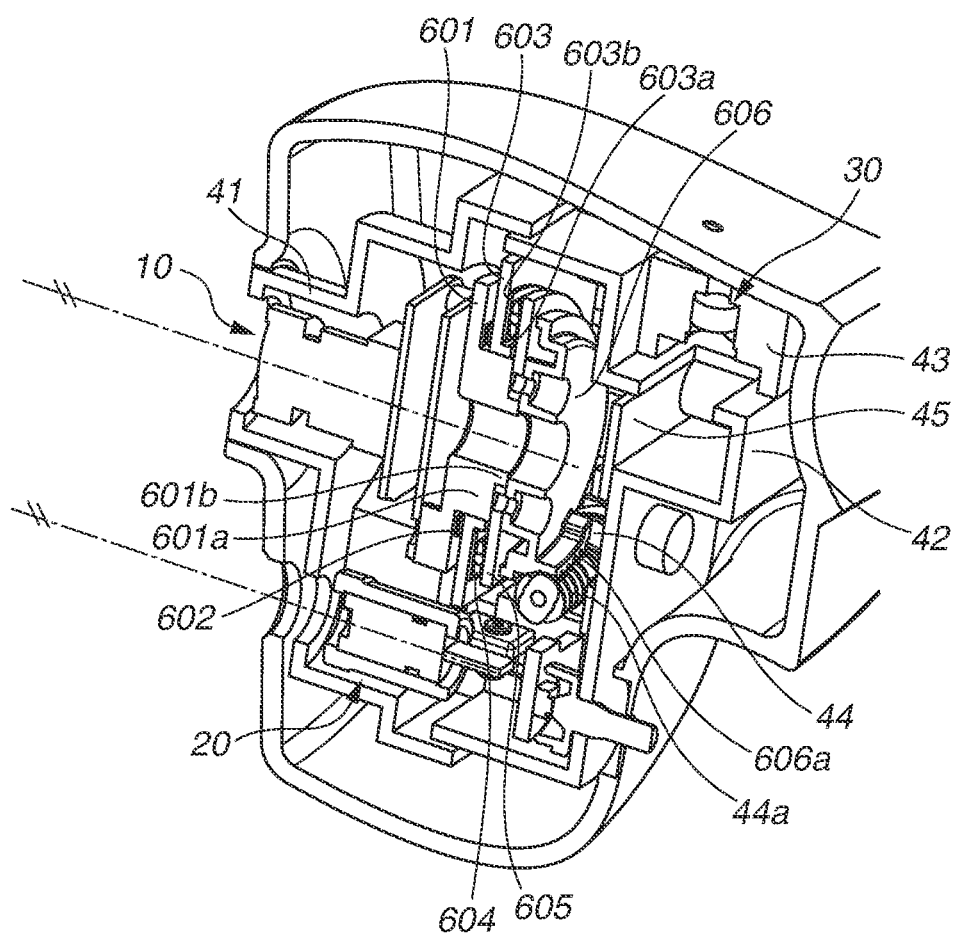
FIG. 14 is a perspective cross-sectional view of a camera unit according to the second exemplary embodiment.
Figure 15:
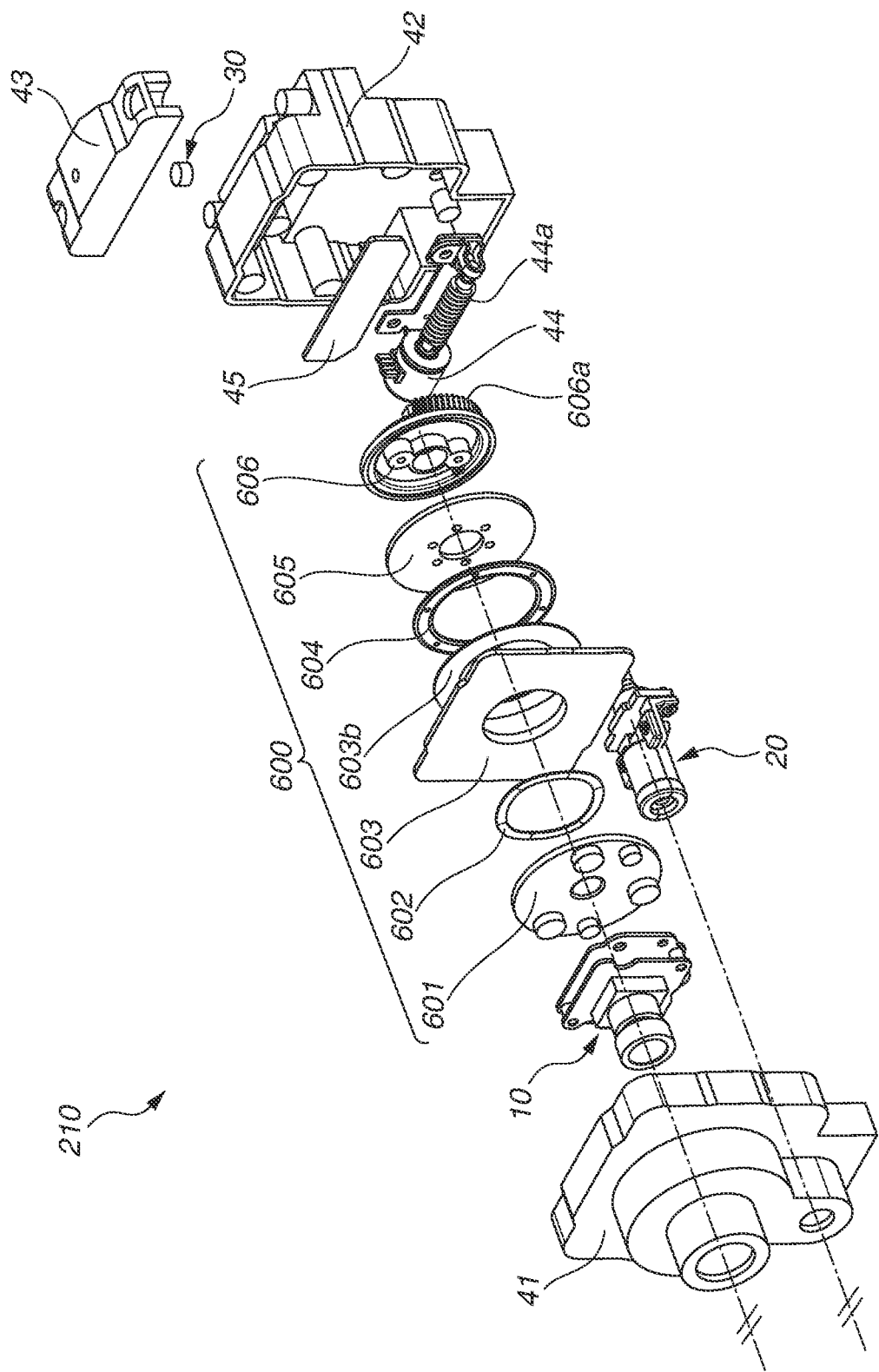
FIG. 15 is an exploded view of the camera unit according to the second exemplary embodiment.

A configuration of the camera unit 210 according to the present exemplary embodiment will be described with reference to FIGS. 14 and 15. The camera unit 210 includes a housing with an upper cover 41, a lower cover 42, and an outlet cover 43, an imaging unit 10, a pointer unit (irradiation unit) 20, a sound collection unit 30, a turning unit 600, a motor unit 44, and a relay substrate 45. As described above, the components with reference signs identical to those of the components of the first exemplary embodiment perform functions similar to those of the first exemplary embodiment, and thus description of these components will be omitted.

The imaging unit 10 includes a lens unit and an imaging element substrate on which an imaging element and a video processing engine are mounted. A video signal acquired by the imaging unit 10 is transmitted to the control unit 400 via the relay substrate 45 and the main cable 500. The control unit 400 has a battery and the like to supply power to the imaging unit 10 through the electrical connection unit. The imaging element substrate of the imaging unit 10 may further have a posture detection sensor (detection unit) such as an acceleration sensor or a gyro sensor.

The turning unit 600 includes a rotational pedestal 601, a biasing member 602, a fixed pedestal 603, a bearing 604, a reinforcement plate 605, and a helical gear 606.

The rotational pedestal 601 has a substantially circular shape molded of a resin or the like, for example, and has a substantially circular opening in the center. The rotational pedestal 601 has substantially cylindrical parts 601a and 601b extending around the substantially circular opening, and has a plurality of bosses on the surface opposite to the substantially cylindrical parts 601a and 601b.

The biasing member 602 is an elastic member such as a wave washer formed of a metal such as SUS, for example. Although the biasing member 602 is formed as a wave washer in the present exemplary embodiment, the biasing member 602 may be an elastic member such as a coil spring, for example, without deviating from the function of the biasing member 602.

The fixed pedestal 603 is a substantially rectangular member molded of a resin, for example, and has a substantially circular opening in the center. The fixed pedestal 603 has a substantially cylindrical unit 603a around the substantially circular opening. As necessary, a slide plate 603b made of a metal such as SUS may be assembled to the fixed pedestal 603. The slide plate 603b may be fixed by a fixing unit such as a screw not illustrated or may be fixed by adhesion or the like.

The bearing 604 is a ring-shaped thin member made of a resin or the like, and functions as a retainer that defines the range of holding a plurality of balls.

The reinforcement plate 605 is a substantially circular plate member formed of a metal such as SUS, for example.

The helical gear 606 is a substantially cylindrical member molded of a resin, for example, and has a substantially circular opening in the center. The helical gear 606 has a helical unit 606a at the outer periphery of the cylinder. Although the gear formed at the outer periphery is a helical gear in the present exemplary embodiment, the gear may be a spur gear without deviating from the function of the gear, for example.

The motor unit 44 is a stepping motor, for example, and a worm gear 44a is press-fitted into the shaft unit. Although the gear press-fitted into the motor shaft is a worm gear in the present exemplary embodiment, the gear may be a spur pinion gear, for example, without deviating from the function of the gear. The motor unit 44 is connected to the control unit 400 with the relay substrate 45 through an electrical connection unit such as a cable not illustrated.

The relay substrate 45 is an electrical substrate on which a connector not illustrated and others are mounted. The relay substrate 45 is connected to the imaging unit 10, the pointer unit 20, and the motor unit 44. Electrical signals acquired by the relay substrate 45 are transmitted to the main cable 500 via the relay substrate 45, and are further transmitted to the control unit 400.

An assembly configuration of the turning unit 600 will be described. The turning unit 600 is assembled by sandwiching the fixed pedestal 603 between the rotational pedestal 601 and the helical gear 606 and then fixing the rotational pedestal 601 and the helical gear 606. When the turning unit 600 is assembled, the biasing member 602 is inserted into a space between the fixed pedestal 603 and the rotational pedestal 601, and the bearing 604 and the reinforcement plate 605 are inserted into a space between the fixed pedestal 603 and the helical gear 606. Then, the substantially cylindrical part 601a of the rotational pedestal 601 is fitted into the substantially circular opening of the fixed pedestal 603, and the substantially cylindrical part 601b is fitted into the substantially circular opening of the reinforcement plate 605.

When the turning unit 600 is assembled in this manner, the rotational pedestal 601 and the helical gear 606 fixed to the rotational pedestal 601 are turnable with respect to the fixed pedestal 603.

An assembly configuration of the camera unit 210 will be described. First, the relay substrate 45 and the motor unit 44 are fixed to the lower cover 42. The turning unit 600 with the imaging unit 10 assembled to the rotational pedestal 601 and the pointer unit 20 are assembled to the lower cover 42. At the time of assembly, the helical unit 606a of the helical gear 606 of the turning unit 600 and the worm gear 44a of the motor unit 44 mesh with each other. When the turning unit 600 is assembled in this manner, the camera unit 210 (more precisely, the turning unit 600) is motor-driven around the center of optical axis of the imaging unit 10 by motive power of the motor unit 44.

The upper cover 41 is put over and assembled to the unit of the lower cover 42 assembled as described above. The upper cover 41 has a light guiding opening 41a for taking a subject image into the imaging unit 10 and a conductive opening 41b for conducting the light emitted from the pointer unit 20.

The lower cover 42 has, on one side surface, an opening through which an electrical connection unit such as a cable not illustrated is inserted. The opening is sealed with the outlet cover 43. The sound collection unit 30 is assembled to the outlet cover 43 by press-fitting or the like, for example, and the outlet cover 43 has an opening through which desired sounds can be input into the sound collection unit 30.

The imaging unit 10 and the pointer unit 20 are arranged with respective optical axes substantially parallel to each other. In side view of the wearable camera 1, with the optical axis of the imaging unit 10 as a base axis, the sound collection unit 30 is arranged on the upper side of the wearable camera 1 with respect to the base axis, and the pointer unit 20 is arranged on the lower side of the wearable camera 1 with respect to the base axis.

Figure 16:
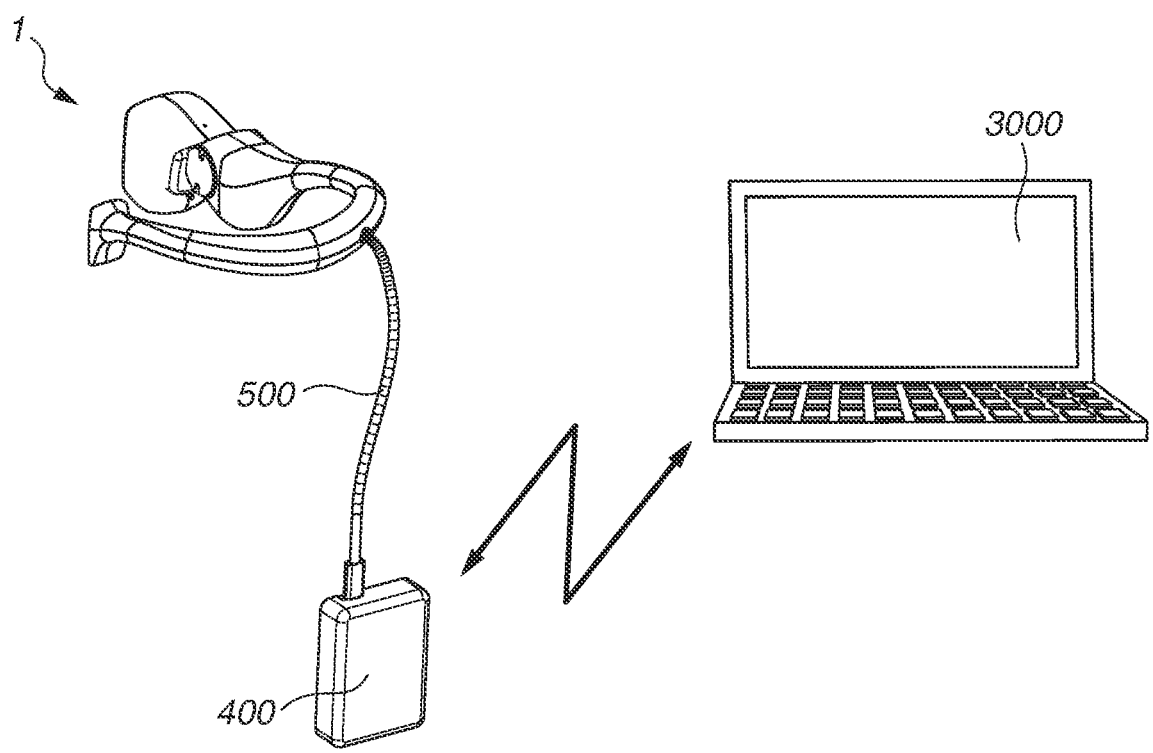
FIG. 16 is a conceptual diagram illustrating a state of communication between the wearable camera according to the second exemplary embodiment and an operation terminal.

Operations of the turning unit 600 will be described with respect to FIGS. 16 and 17. The control unit 400 has a wireless communication module (reception unit) not illustrated, and is communicable with an operation terminal (information processing device) 3000 such as a personal computer (PC) or a smartphone, for example. An instruction to the wearable camera 1 is input into the operation terminal 3000, and is transmitted as an instruction signal to the control unit 400. The wearable camera 1 receives the instruction signal from the operation terminal 3000 via the reception unit of the control unit 400. Although a wireless communication module is configured in the present exemplary embodiment, the control unit 400 may have a separate LAN connector for wired connection with the operation terminal 3000. The control unit 400 further has a control engine and a motor driver not illustrated, and transmits a control signal generated based on the received signal to the motor unit 44 via the main cable 500 and the relay substrate 45. With this configuration, the operator of the operation terminal 3000 different from the wearer of the wearable camera 1 can remotely operate the turning unit 600.

In a case where the imaging unit 10 is equipped with a posture detection sensor (detection unit) as described above, the posture detection sensor detects the gravitational direction when the wearable camera 1 is worn. The detection unit generates a signal for correcting the inclination of the imaging element to a horizontal position, and transmits the signal to the control unit 400. The control unit 400 generates a control signal using the received signal and returns the control signal to the motor unit 44.

That is, the detection unit detects the posture of the user, and the control unit 400 controls the motor unit 44 based on information on the detected posture of the user. More specifically, the detection unit detects the posture of the user by detecting the inclination of the imaging unit 10 with respect to the horizontal direction that is the imaging direction. Based on the information on the posture of the user including the detected inclination with respect to the horizontal direction, the control unit 400 controls the motor unit 44 to correct the inclination of the imaging unit 10 caused by the posture of the user to a substantially horizontal position. Furthermore, the control unit 400 turns the motor unit 44 to cancel out the inclination of the imaging unit 10 so that the inclined imaging unit 10 is maintained at a substantially horizontal position.

Accordingly, the inclination of the acquired video resulting from differences in body size and wearing tendency or posture among wearers of the wearable camera 1 can be corrected by turning the imaging unit 10.

FIG. 17A illustrates the state in which the turning unit 600 is not turned, and FIG. 17B illustrates the state in which the turning unit 600 is turned. With the turning unit 600 configured as described above, the entire camera unit 210 is not turned but the imaging unit 10 alone is turned. Thus, the imaging unit 10 can be turned by the wearer under a light load. The load on the motor unit 44 is also lighter than that with the camera unit 210 entirely turned. Furthermore, since the entire camera unit 210 is not turned, the position of irradiation by the pointer unit 20 is unlikely to shift to a position that is not intended by the user.

In a case where a wearer wears the wearable camera 1 configured as described above, for example, the wearer brings the base unit 101 of the fixed unit 100 into contact with the back of the neck, and hangs the entire device on the neck such that the contact surface 102a of the right arm unit 102 and the contact surface 103a of the left arm unit 103 are brought into contact with the vicinity of the breast. In this manner, the wearable camera 1 according to the present exemplary embodiment is put on the wearer's neck such that the right arm unit 102 and left arm unit 103 of the fixed unit 100 sandwich the wearer's neck.

When the wearer wears the wearable camera 1 configured as described above, the sound collection unit 30, the imaging unit 10, and the pointer unit 20 are arranged in this order from the wearer's point of view, so that the sound collection unit 30 can favorably acquire the voice uttered by the wearer.

Figure 8:
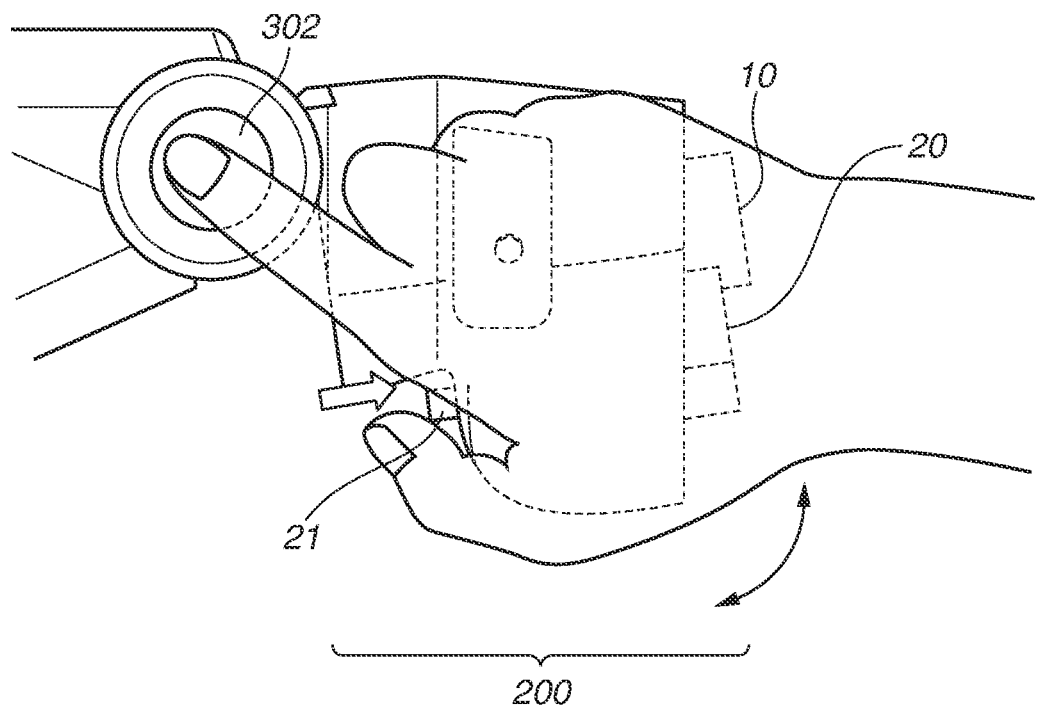
FIG. 8 is a schematic diagram illustrating an operation of the movable unit of the wearable camera according to the first exemplary embodiment.
Figure 18A:
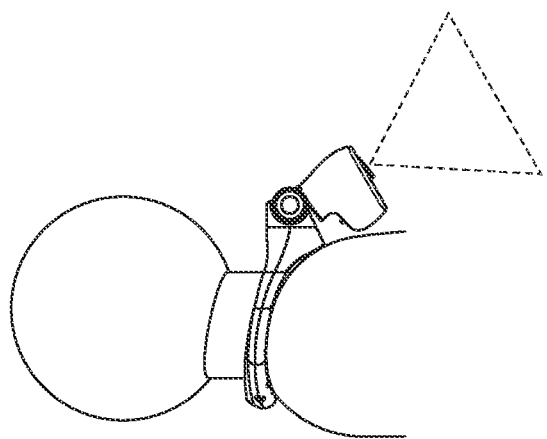
FIGS. 18A to 18C are side views of the movable unit of the wearable camera according to the second exemplary embodiment, which illustrate the movable ranges of the movable unit.
Figure 18B:
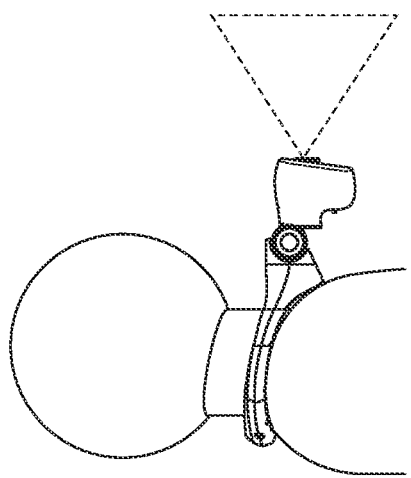
Figure 18C:
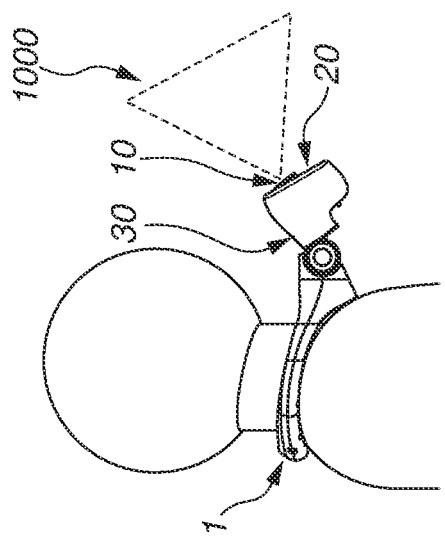
Figure 19:
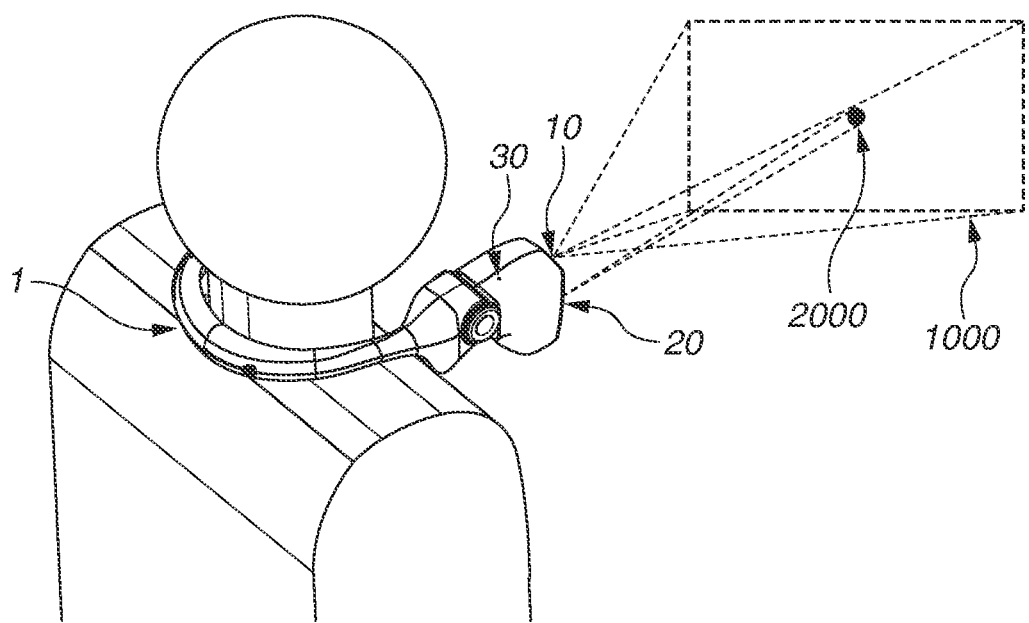
FIG. 19 is a schematic diagram illustrating a state in which a user wears the wearable camera according to the second exemplary embodiment.
Figure 20:
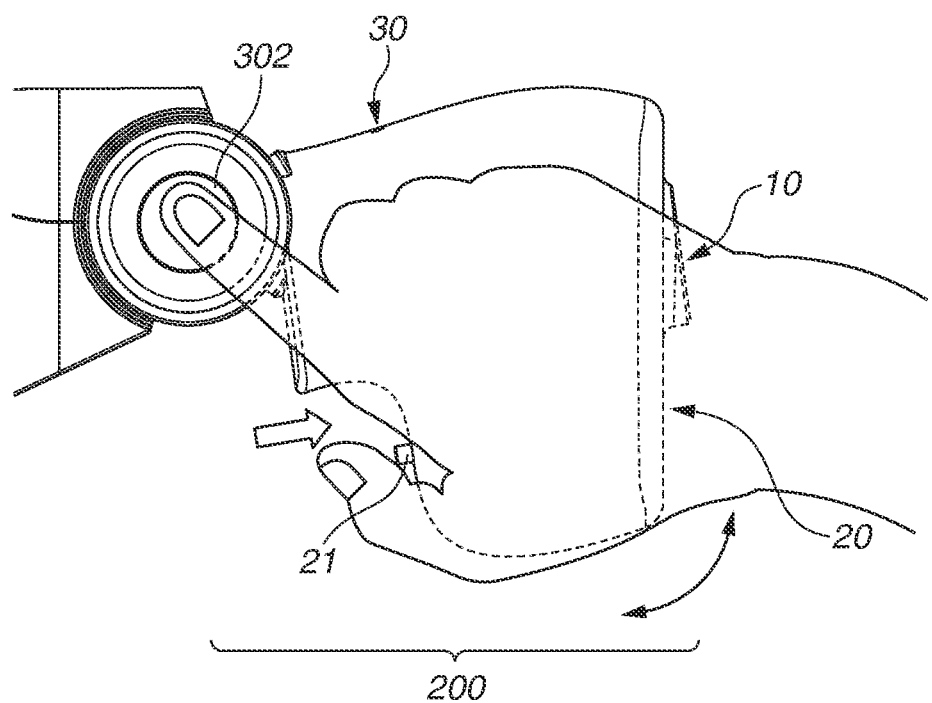
FIG. 20 is a schematic diagram illustrating an operation of the movable unit of the wearable camera according to the second exemplary embodiment.

FIGS. 18 to 20 correspond to FIGS. 6 to 8 and illustrate functions similar to those of the first exemplary embodiment, and thus description with reference to FIGS. 18 to 20 will be omitted.

Figure 21:
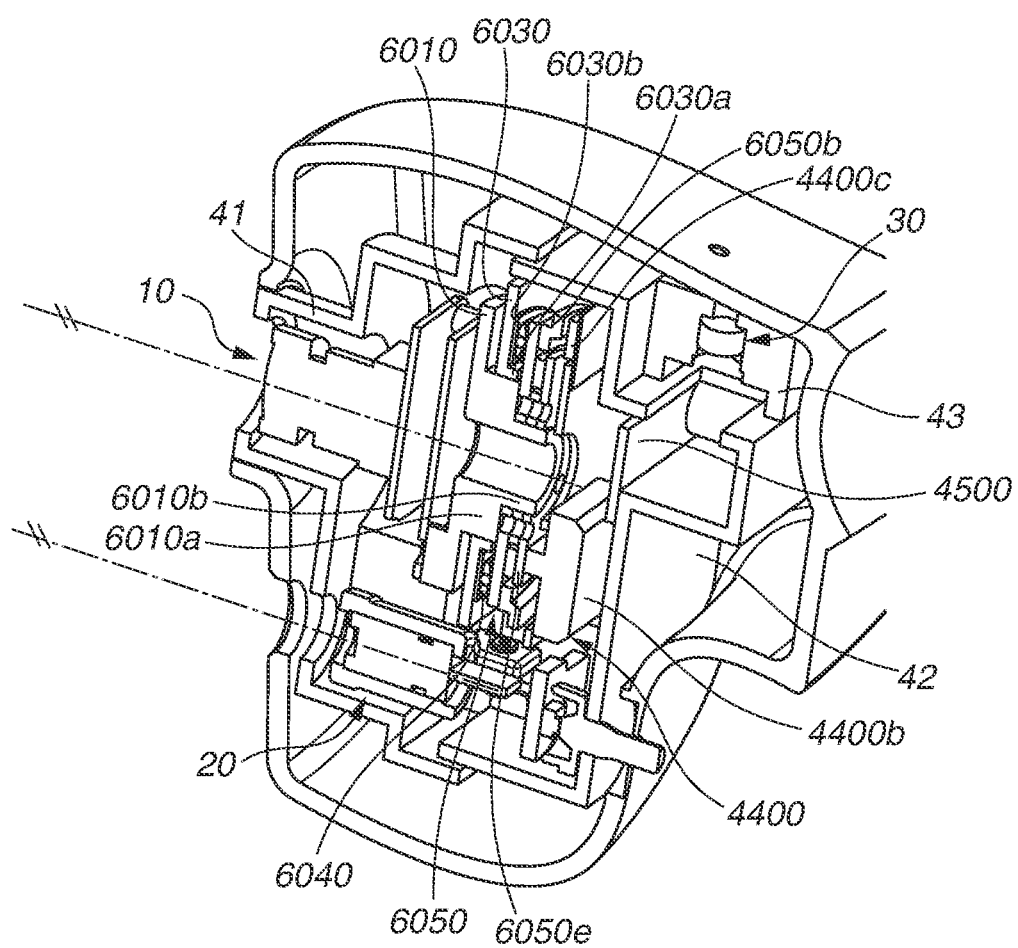
FIG. 21 is a perspective cross-sectional view of a camera unit according to a third exemplary embodiment.
Figure 22:
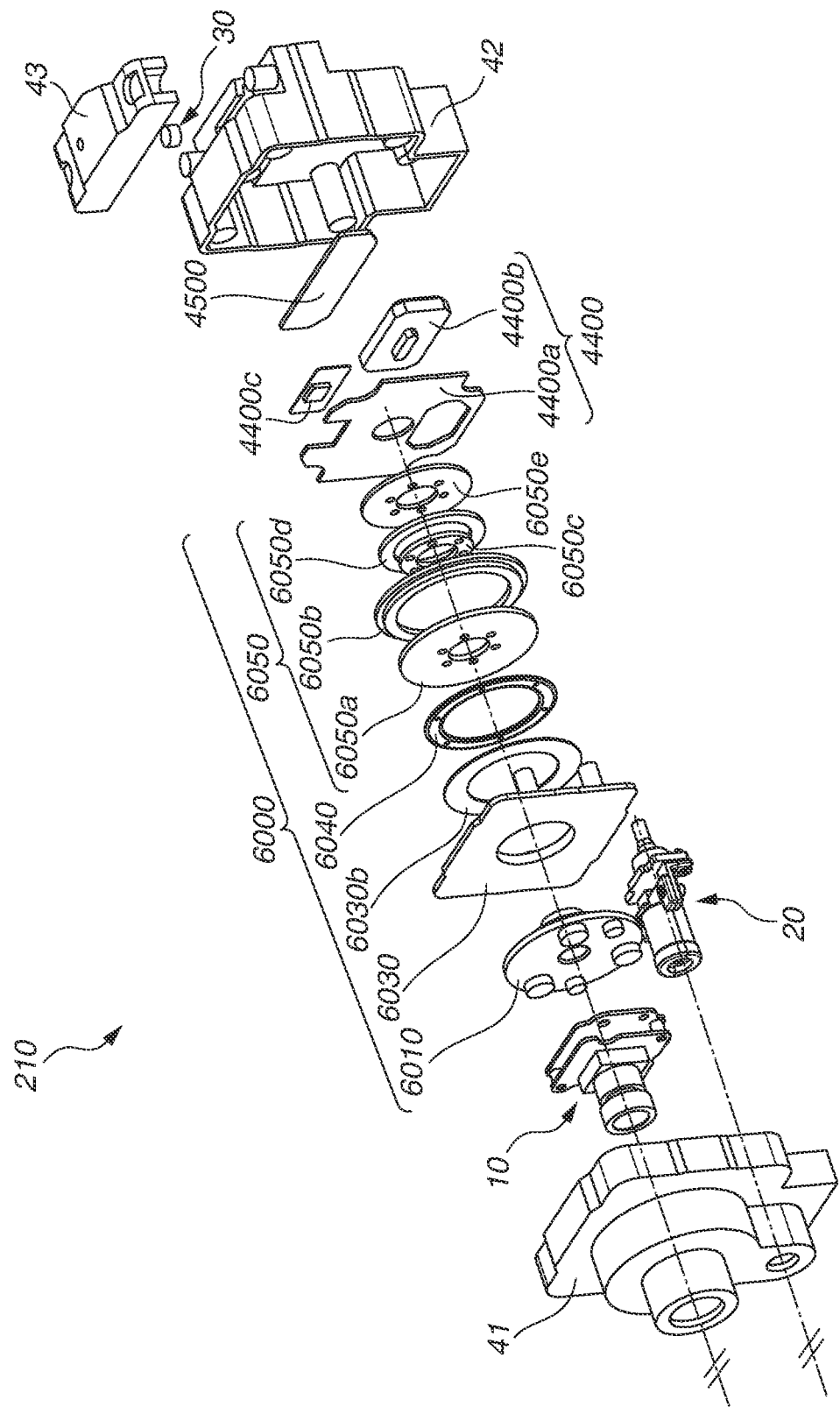
FIG. 22 is an exploded view of the camera unit according to the third exemplary embodiment.

A turning unit 6000 of a wearable camera according to a third exemplary embodiment will be described with reference to FIGS. 21 and 22. In FIGS. 21 and 22, components identical in function to those of the wearable cameras according to the first and second exemplary embodiments are denoted by identical reference signs, and descriptions of these components will be omitted.

A camera unit 210 is configured such that an imaging unit 10, a pointer unit 20, a sound collection unit 30, the turning unit 6000, a motive power unit 4400, and a relay substrate 4500 are included in a housing formed of an upper cover 41, a lower cover 42, and an outlet cover 43.

The turning unit 6000 includes a rotational pedestal 6010, a fixed pedestal 6030, a bearing 6040, and a passive plate unit 6050.

The rotational pedestal 6010 has a substantially circular shape molded of a resin or the like, for example, and has a substantially circular opening in the center. The rotational pedestal 6010 has substantially cylindrical parts 6010a and 6010b extending around the substantially circular opening, and has a plurality of bosses on the surface opposite to the substantially cylindrical parts 6010a and 6010b.

The fixed pedestal 6030 is a substantially rectangular member molded of a resin, for example, and has a substantially circular opening in the center. The fixed pedestal 6030 has a substantially cylindrical unit 6030a around the substantially circular opening. As necessary, a slide plate 6030b made of a metal such as SUS may be assembled to the fixed pedestal 6030. The slide plate 6030b may be fixed by a fixing unit such as a screw not illustrated or may be fixed by adhesion or the like.

The bearing 6040 is a ring-shaped thin member made of a resin or the like, and functions as a retainer that defines the range of holding a plurality of balls. The passive plate unit 6050 includes a reinforcement plate 6050a, an encoder plate 6050b, a spacer 6050c, a vibration-proof material 6050d, and a passive plate 6050e.

The reinforcement plate 6050a is a substantially circular plate member made of a metal such as SUS, for example. The encoder plate 6050b is a ring-shaped plate member molded of a resin or the like, for example. The encoder plate 6050b is formed by sticking an encoder scale not illustrated to the surface of a plate. The spacer 6050c is a substantially circular plate member formed of a resin or a metal. The vibration-proof material 6050d is a substantially circular member made of rubber or gel. The passive plate 6050e is a substantially circular plate member formed of a metal such as SUS, for example, and has a substantially circular opening in the center.

The passive plate unit 6050 is formed such that the encoder plate 6050b, the spacer 6050c, and the vibration-proof material 6050d are sandwiched between the reinforcement plate 6050a and the passive plate 6050e.

The motive power unit 4400 includes a unit base 4400a, a vibration actuator 4400b, and an encoder 4400c. The unit base 4400a is a substantially rectangular plate member formed of a metal such as SUS, for example. The vibration actuator 4400b includes a piezoelectric element, an elastic member, and a vibrator, which are not illustrated, and is connected to a control unit 400 via the relay substrate 4500 by an electrical connection unit such as a cable not illustrated.

The relay substrate 4500 is an electrical substrate on which a connector not illustrated and others are mounted. The relay substrate 4500 is connected to the imaging unit 10, the pointer unit 20, the motive power unit 4400, and the encoder 4400c by electrical connection units such as cables not illustrated, and is connected to the control unit 400 via a main cable 500.

An assembly configuration of the turning unit 6000 will be described. The turning unit 6000 is assembled by sandwiching the fixed pedestal 6030 between the rotational pedestal 6010 and the passive plate unit 6050 and then fixing the rotational pedestal 601 and the passive plate unit 6050. At the time of assembly, the bearing 6040 is inserted into a space between the fixed pedestal 6030 and the passive plate unit 6050. The substantially cylindrical part 6010a of the rotational pedestal 6010 is fitted into the substantially circular opening of the fixed pedestal 6030, and the substantially cylindrical unit 6010b is fitted into the substantially circular opening of the passive plate unit 6050. When the turning unit 6000 is assembled in this manner, the rotational pedestal 6010 and the passive plate unit 6050 fixed to the rotational pedestal 6010 are turnable with respect to the fixed pedestal 6030.

An assembly configuration of the camera unit 210 will be described. First, the relay substrate 4500 and the motive power unit 4400 are fixed to the lower cover 42. The turning unit 6000 with the imaging unit 10 assembled to the rotational pedestal 6010 and the pointer unit 20 are assembled to the lower cover 42. At the time of assembly, the passive plate 6050e of the turning unit 6000 and the vibrator of the vibration actuator 4400b of the motive power unit 4400 come into contact each other. The vibrator is brought into contact with the passive plate unit 6050 by an elastic member included in the vibration actuator 4400b. When the camera unit 210 is assembled in this manner, the camera unit 210 can turn the imaging unit 10 by the motive power of the motive power unit 4400.

As described above, according to the wearable camera in the present exemplary embodiment, the wearer can adjust the field of angle of the movable unit 200 to the desired working position so that the subject to be imaged can fall within the angle of field. Further, providing the movable unit 200 with the pointer unit 20 allows the user to easily specify the imaging region even with an adjustment made to the field of angle. Even if the acquired video is inclined due to differences in body size or wearing tendency among wearers of the wearable camera 1, the inclination can be corrected by operating the turning unit 600, and as a result, the remote assistant can perform assistance work under a light load.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-061234, filed Mar. 31, 2022, and No. 2022-204895, filed Dec. 21, 2022, which are hereby incorporated by reference herein in their entirety.

What is claimed is:

1. A wearable camera comprising:
an imaging unit configured to capture an image of a subject;
at least one processor; and
a memory coupled to the at least one processor, the memory storing instructions that, when executed by the processor, cause the processor to function as:
an irradiation unit configured to emit light in a direction substantially parallel to an optical axis of the imaging unit;
an attachment unit for attaching the wearable camera to a user; and
a movable unit that is provided at a part of the attachment unit,
wherein the imaging unit and the irradiation unit are arranged on the movable unit; and further comprising a switch for the irradiation unit that is arranged behind the irradiation unit, wherein a direction of an optical axis of a light source of the irradiation unit and a pressing direction of the switch are arranged in substantially parallel to each other.

2. The wearable camera according to claim 1, further comprising a lock mechanism configured to regulate mobility of the movable unit and an unlock button configured to cancel regulation by the lock mechanism.

3. The wearable camera according to claim 2, wherein the lock mechanism has a turning lock gear and an elastic member, and biases the turning lock gear by the elastic member.

4. The wearable camera according to claim 1, wherein the turning unlock button and the switch are arranged to enable operation at the same time.

5. The wearable camera according to claim 1, wherein the light source of the irradiation unit is a laser pointer.

6. The wearable camera according to claim 1, wherein the light source of the irradiation unit is a light-emitting diode.

7. The wearable camera according to claim 1, further comprising a turning unit that is turnable around a center of the optical axis of the imaging unit.

8. The wearable camera according to claim 7, wherein the turning unit includes a motor that turns the turning unit.

9. The wearable camera according to claim 8, further comprising:
a reception unit configured to receive an instruction signal from an external information processing apparatus; and
a control unit configured to drive the motor based on the instruction signal.

10. The wearable camera according to claim 8, further comprising:
a detection unit configured to detect a posture of the user; and
a control unit configured to control the motor based on information on the posture of the user detected by the detection unit.

11. The wearable camera according to claim 10, wherein the control unit controls the motor so as to correct an inclination of the imaging unit caused by the posture of the user and maintain the imaging unit at a substantially horizontal position based on the information on the posture of the user detected by the detection unit.

12. The wearable camera according to claim 10,
wherein the detection unit detects the posture of the user by detecting the inclination of the imaging unit with respect to the horizontal direction, and
wherein the control unit controls the motor based on the information on the posture of the user including the inclination of the imaging unit with respect to the horizontal direction.

13. The wearable camera according to claim 10, wherein the detection unit is an acceleration sensor or a gyro sensor.

14. The wearable camera according to claim 1, wherein a turning unit turns the imaging unit alone without turning the irradiation unit.

* * * * *